United States Patent [19]

Yamada

[11] Patent Number: 4,796,601
[45] Date of Patent: Jan. 10, 1989

[54] SMOKELESS ROASTER

[75] Inventor: Takeshi Yamada, Nagoya, Japan

[73] Assignee: Shinpo Kabushiki Kaisha, Nagoya, Japan

[21] Appl. No.: 119,815

[22] Filed: Nov. 12, 1987

[51] Int. Cl.$^4$ ............................................. F24C 15/20
[52] U.S. Cl. ............................. 126/299 R; 126/41 R; 126/300; 98/115.1
[58] Field of Search ............. 126/299 R, 21 A, 21 R, 126/299 D, 299 C, 300, 301, 302, 80; 98/115.1; 55/DIG. 36

[56] References Cited

U.S. PATENT DOCUMENTS

| | | | |
|---|---|---|---|
| 2,526,166 | 10/1950 | Smith | 126/299 D |
| 4,335,705 | 6/1982 | Kiyomitu | 126/299 R |
| 4,508,097 | 4/1985 | Berg | 126/41 R |
| 4,582,046 | 4/1986 | Yamada | 126/299 R |
| 4,603,684 | 8/1986 | Kazuo et al. | 126/299 R |
| 4,616,626 | 10/1986 | Soon | 126/299 R |
| 4,648,378 | 3/1987 | Nishikawa | 126/299 D |

Primary Examiner—James C. Yeung
Attorney, Agent, or Firm—Flynn, Thiel, Boutell & Tanis

[57] ABSTRACT

A smokeless roaster comprises a ceiling or upper support wall extending horizontally and having an opened upper end; a roasting unit comprising an outer box having an opened upper end and mounted on the ceiling at the end edges thereof, an inner box having an opened upper end and supported by the outer box at the end edges thereof, and an exhausting unit provided at the lower part of the roasting unit tapering downwardly, the inner box having a metal grill at the upper portion thereof and a burner at the connected to the exhausting unit through a fixed pipe lower portion thereof; a movable draft pipe and having diameter being substantially same as maximum diameter of the exhausting unit; a connector box provided at the lower part of the movable draft pipe and connected with the movable draft pipe and having a static pressure equalizer for equalizing a suction force applied to the roasting unit; and a duct unit provided at the side of the connector box.

12 Claims, 3 Drawing Sheets

SMOKELESS ROASTER

BACKGROUND OF THE INVENTION

1. Field of the Invention

The present invention relates to a smokeless roaster, more particularly to a smokeless roaster enabling the collection of a smoke generated by roasting a meat and the like and an exhaust gas, to thereafter cool and discharge the collected smoke and the exhaust gas so that a suction force applied to the roaster is equalized with the static pressure.

2. Prior Art

There has been known an exhauster for drawing downwardly a smoke and an exaust gas via the roaster comprising a roasting unit coupled with a duct unit provided therein and a metal grill where the cooking material is placed. With such an arrangement, the smoke is sucked from the roaster downwardly of the exhauster. However, such an arrangement of the exhauster generated such shortcomings that a combustion gas in high temperature produced by a burner is drawn to some extent downwardly from the exhauster before the cooking material is heated by the combustion gas to thereby reduce conspicuously the combustion effect as well as effecting an imcomplete combustion. Furthermore, such arrangmement of the conventional exhauster construction needs an exhausting pipe made of a stainless steel winding asbestos therearound for discharging the exaust gas of high temperature so that the exhausting pipe is manufactured with high cost. In the exhausting system adapted to employ many roasters with the use of a single exhausting duct, a damper provided at a connection part between each of roasters and each of the exhausting ducts is selectively openable to adjust the suction force which is differentiated at a distance between the exhausting duct and the fan thereof. With such an arrangement of the construction, it is difficult to adjust uniformly the suction force of all the roasters since the amount of exhaust gas sucked into the exhausting duct is increased or decreased, namely, even if the damper for use in one of the roasters is adjusted, the suction forces in the other remaining roasters are changed. Furthermore, since fresh secondary air is not supplied into the inner box of the exhauster, the intensity of oxygen is thin in the inner box which results in effecting an incomplete combustion at the burner. Still furthermore, since the combustion state of the burner and the suction of the roasting smoke are changed depending on the area occupied by the cooking materials placed on the metal grill, and the cooking material is exposed to a dried air accompanied with a suction of the smoke in the inner box, the cooking materials are dried and deteriorated in the taste inherent to the cooking materials.

SUMMARY OF THE INVENTION

It is therefore a first object of the present invention to overcome the shortcomings of the conventional exhauster by providing a smokeless roaster enabling the cooling and discharging of an exhaust gas generated at the roaster as well as achieving a stable suction force in the roaster.

It is a second object of the present invention to provide a smokeless roaster enabling the decreasing of the termperature of the exhaust gas and the adjustment of the suction force for each of the roasters independently thereof, when a plurality of roasters are employed, by introducing secondary air in the room into the exhast gas without connecting the roasting unit with the duct unit.

To achieve the above objects, the present invention comprises a roasting unit including an outer box, an inner box provided inside the outer box and having a metal grill such as a steel grill, a gas burner and a passage having a width corresponding to the distance defined between the outer box and the inner box for effecting the suction operation, the outer box and the inner box being fixedly mounted in the roasting unit, a movable draft pipe vertically slidably fitted in the exhaust unit provided at a lower part of the outer box, a connector box provided at a lower part of the movable draft pipe, a duct unit to be insertably connected with the connector box, and a static pressure equalizer for equalizing a suction force with a static pressure provided in the connector box having a slit of substantially triangle shape which is gradually widening from the lower portion to the upper portion and is brought into contact with the inside of the movable draft pipe in the manner to separate slantly the exhaust gas passage from the inner passage to the outer passage thereof.

The above and other objects, features and advantages of the present invention will become more apparent from the following description when taken in conjunction with the accompanying drawings in which preferred embodiments of the present invention are shown by way of illustrative examples.

DESCRIPTION OF THE PREFERED EMBODIMENT

Figure 1:
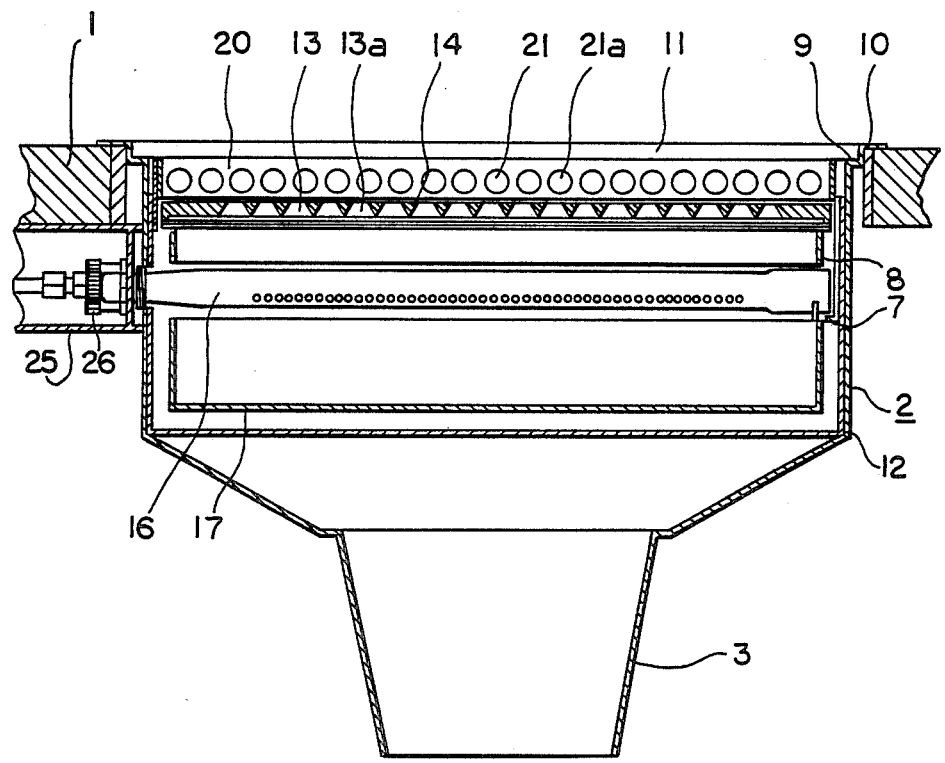
FIG. 1 is a central horizontal cross sectional view of a roaster unit of a smokeless roaster according to the present invention.

A smokeless roaster according to the present invention will be described with reference to FIGS. 1 to 4.

A smokeless roaster comprises a roasting unit 2 fixedly mounted on a ceiling or upper support wall 1, a movable draft pipe 4 connected to an exhausting unit 3 of the roasting unit 2, a connector box 5 connected to the movable draft pipe 4, and a duct unit 6 connected to the connector box 5.

The roasting unit 2 comprises an outer box 7 and an inner box 8 respectively having opened upper ends. The upper end of the outer box 7 is bent outwardly in two stages to define flanges 9, 10. The flange 10 is adapted to be fixedly or detachably mounted on the end edges of the opening 11 defined in the ceiling 1 so that the roasting unit 2 is supported by the ceiling 1. The number of openings 11 is determined depending on the number of roasting units 2 to be mounted therein.

Figure 2:
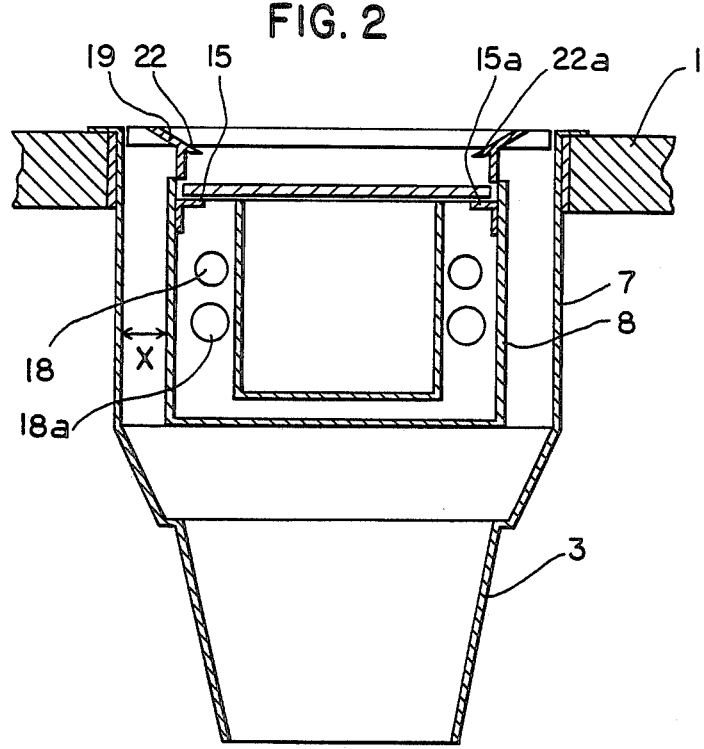
FIG. 2 is a central vertical cross sectional view of a roasting unit in FIG. 1.
Figure 4:
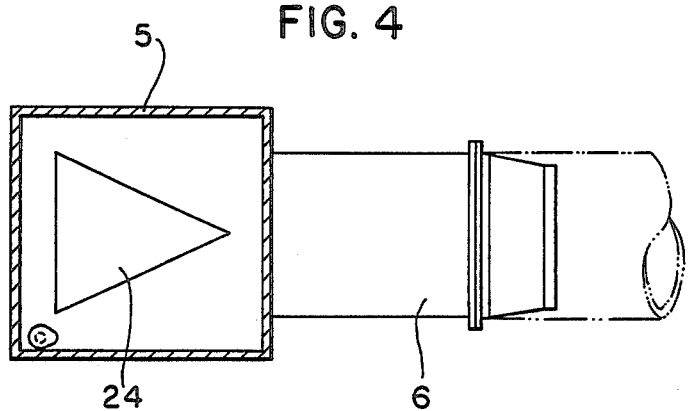
FIG. 4 is a cross sectional view of a static pressure equalizer of the smokeless roaster according to the present invention.

The inner box 8 is stably supported by the outer box 7 at the constricted part 12 of the outer box 7. The inner box 8 has a slightly smaller size than the outer box 7 in both lengthwise and widthwise direction to thereby define the suction passage X having a width corresponding to the distance between the outer box 7 and the inner box 8 as shown in FIG. 2.

The inner box 8 has a metal grill such as a steel grill 14 having slits 13, 13a with a predetermined space at the upper portion of the inner box 8, the metal grill 14 being placed on holding pieces 15, 15a fixedly mounted on the inner wall of the inner box 8, a gas burner 16 including twined gas burners 16 provided at the lower part of the metal grill 14 and a drain pan 17 for receiving an oil, gravy of the roasted meat or the like of the cooking materials. The inner box 8 has manifolds 18, 18a for introducing the fresh secondary air in the room into the gas burner 16 and are provided on the side wall thereof by penetrating vertically thereof in good order.

The outer box 7 supports a top plate 20 having a stage bent outwardly by fixedly mounting the stage on the flange 9 of the outer box 7. The top plate 20 is provided over the metal grill 14 and has openings 19 in confronting relation to the metal grill 14. The top plate 20 has suction holes 21, 21a formed by penetrating the top plate 20, in a circular shape in a predetermined number of times, and are arranged in good order in the lengthwise direction but has no suction holes in the widthwise direction, and has projections 22, 22a formed in the end edge thereof by bending or slanting inwardly the opening 19 from the top end thereof. The roasting smoke runs into the projections 22, 22a where the roasting smoke is rebounded to return to the metal grill 14 so that the cooking materials are well roasted with adiabatic efficiency because of the return of the hot smoke.

The roasting unit 2 tapers in the lower end thereof to form the exhausting unit 3. The movable draft pipe 4 is vertically slidably and movably fitted on the outer circumference of the exhausting unit 3, the maximum diameter of which is substantially the same as the outer diameter of the movable draft pipe 4. The width of the gap provided between the diameter of the exhausting unit 3 and the movable draft pipe 4 is adjustable by the vertical sliding operation of the movable draft pipe 4. A connector box 5 is provided at the lower part of the movable draft pipe 4 and the duct unit 6 is connected with connector box 5 at the side surface thereof. A fixed pipe 28 is provided on the connector box 5 and connects the exhausting unit 3 with the connector box 5 through the movable draft pipe 4. The movable draft pipe 4 encloses the outer circumference of the exhausting unit and is vertically slidably fitted on the inner circumference of the fixed pipe 28. The movable draft pipe 4, the fixed pipe 28 and the duct unit 6 are arranged in a L-shaped fashion with respect to the connector box 5. The connector box 5 has a space larger than the space to accomodate the exhausting unit 3 and the duct unit 6 and also has a static pressure equalizer 24 comprising a slit of substantially triangular shape which gradually widens from the lower portion to the upper portion and is brought into contact with the inside of the movable draft pipe 4 in a manner so as to slantly separate the exhaust gas passage from the inner passage to the outer passage thereof.

Figure 3:
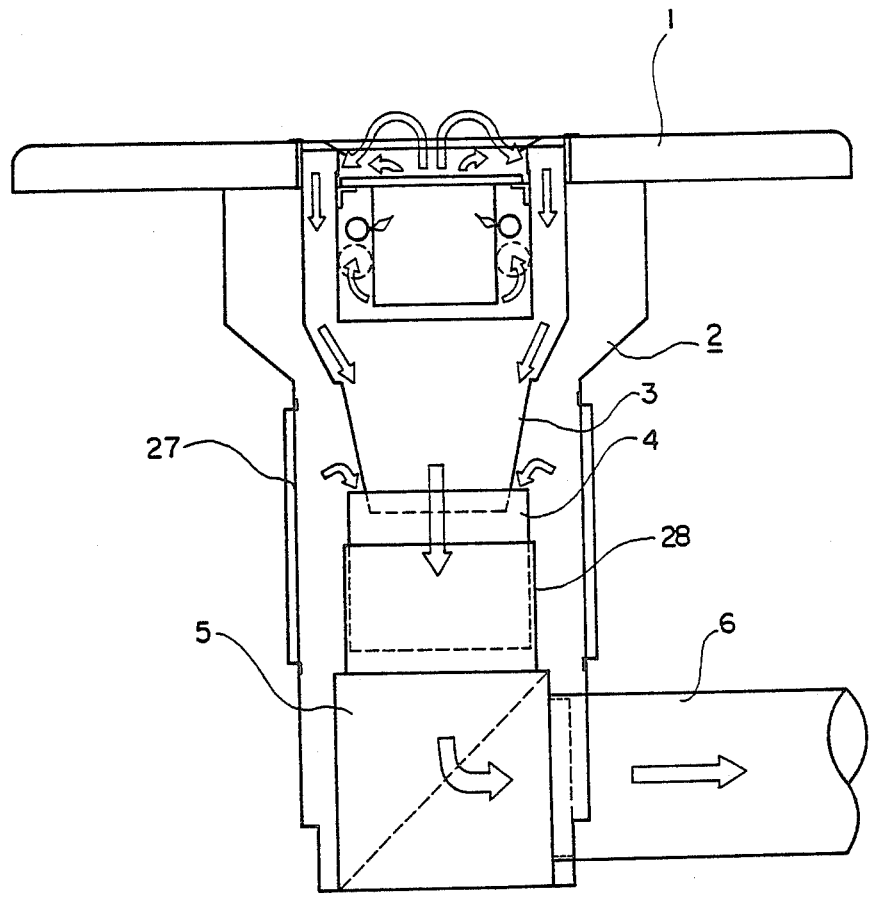
FIG. 3 is a schematic view showing a flow of the smoke in a smokeless roaster according to the present invention.

The gas burner 16 has a switch box 25 at the inlet portion thereof and the switch box 25 houses therein a regulator 26. A louver 27 is provided at the side of the roasting unit 2 for introducing air in the room in the smokeless roaster as illustrated in FIG. 3.

An operation of the smokeless roaster according to the present invention will be described hereafter.

When the cooking materials are placed on the metal grill 14 and subjected to roasting by actuating the gas burner 16, the suction force is applied to the outer box 7 via the duct unit 6, the connector box 5, and the movable draft pipe 4. At the time when the smoke generated with the lapse of time of roasting is sucked in the openings 21, 21a provided at the upper circumference of the metal plate 20 with the exhaust gas, the air in the rooms is simultaneously sucked in (described later) due to laminar flow effect so that the exhaust gas is sucked into and discharged from the duct unit 6 via the outer box 7, the exhausting unit 3, and the connector box 5. In the inner box 8, the secondary air to be supplied from the outside of the roasting unit 2 to the gas burner 16 for combustion via the intake manifolds 18, 18a to promote to effect the complete combustion.

At the time when the movable draft pipe 4 is lowered to provide the gap between the draft pipe 4 and the exhausting unit 3 while the exhaust gas is passed through the exhausting unit 3, the air in the room introduced from the louver 27 is introduced from the gap with the flow from the movable draft pipe 4 to the exhausting unit 3 whereby the exhausting gas is cooled and the appropriate suction force is applied to the roasting unit 2.

At the time of the suction of the exhaust gas, the exhaust gas is restricted to be passed since the width of the slit of the static pressure equalizer 24 is narrow at the inner flow which has a strong suction force in the connector box 5 while the exhaust gas is passed easilily proportional to the width of the slit which is wider toward the outer flow having a weak suction force, so that the exhaust gas from the roasting unit 2 is sucked at the same speed at any point in cross section.

As mentioned above, inasmuch as the smokeless roaster according to the present invention comprises the outer box 7 which is subjected to a suction operation, the inner box 8 having the metal grill 14 such as a steel grill and the gas burner 16, the outer box 7 and the inner box 8 are spaced with a width of X defining the suction passage, the exhaust gas generated from the gas burner 16 is not drawn directly to the duct unit 6 but is entirely applied to the cooking materials on the metal grill 14 whereby the heat loss is prevented. Furthermore, the air in the room is introduced from the gap to the exhausting unit 3 simultaneously with the suction of the roasting smoke into the outer box 7 to thereby reduce conspicuously the temperature of the exhaust gas. Accordingly, the exhauster is manufactured with low cost since the duct unit 6 is able to be manufactured of a synthetic resin with low cost and easy fabrication.

Furthermore it is possible to effect a stable discharge operation by adjusting the suction force by use of the single duct unit provided at one of the roasters at the time of effecting the discharge of the plurarity of roasters without changing the suction force of the other remaining roasters independently of each other.

Since the static pressure equalizer 24 provided in the connector box 5 has the slit which is brought into contact with the connector box 5 in the manner to slantly separate the exhaust gas passage and widens from the lower portion to the upper portion thereof, the suction force applied to the exhausting unit 3 is uniform in any point in the cross section to stabilize the suction operation of the roasting smoke in the roasting unit 2. Furthermore, since the exhaust gas passage is narrowed by the slit of the static pressure equalizer 24, even if the suction force applied to the duct unit 6 is changed slightly, the thus changed suction force does not directly act on the roasting unit 2 which results in serving the pressure limiter.

Inasmuch as each of the parts of the roasting unit 2 is removable and disassembled by one touch operation to thereby enable the cleaning of the roasting unit with ease. Furthermore, inasmuch as the smoke or the smell produced by roasting the cooking materials is completely shut out and no heat is radiated toward the room which results in no reduction of cooling effect in the room, the meat is wrapped by hot air and roasted due to a laminar flow without being dried and deteriorating the succulent taste and tenderness of the meat.

Still furthermore, inasmuch as the gas combustion is effected under the complete suction system provided exclusively for the suction duct, the reduction of the gas comsumption and increase of the thermal efficiency is achieved. Inasmuch as the discharge is effected with the use of a duct enabling discharge in high speed under the temperature of 40° C. or below, the discharge duct is optimally employed as a round duct having a low resistance and may be made of a pipe of vinyl chloride when embedded which result in manufacturing in low cost. With provision of the arrangement of the top plate 20 and the connector box 5, 90% of the grease used during the roasting can be collected inside the roasting unit so that the operator is relieved from the notice of the stain of the oil and the dust and the maintenance of the roaster.

What is claimed is:

1. A smokeless roaster comprising:
   (a) an upper support wall extending horizontally and having an opening contained therein;
   (b) a roasting unit comprising an outer box having an opened upper end, said outer box being mounted and supported within said opening in said upper support wall by end edges thereon, an inner box having an opened upper end contained and supported in the outer box by end edges thereon, said inner box having a metal grill contained at an upper portion thereof and a burner provided at a lower portion thereof, and an exhausting unit provided at a lower part of said roasting unit, said exhausting unit diminishing in outer and inner diameter as it extends away from said lower part of said roasting unit;
   (c) a movable draft pipe vertically, slidably fitted on the outer circumference of said exhausting unit, said movable draft pipe being capable of introducing outside air into gas exhausted from said roasting unit and regulating a suction force applied to said roasting unit, said movable draft pipe additionally having an inner diameter approximately equal to the maximum outer diameter of said exhausting unit;
   (d) a connector box provided at a lower part of said movable draft pipe and connected therewith at a side surface thereof through a fixed pipe, said connector box containing a static pressure equalizer comprising a slit of triangular shape, said slit gradually widening from a lower portion to an upper portion thereof and separating an inner exhaust passage from an outer exhaust passage, said static pressure equalizer equalizing said suction force applied to said roasting unit with a static pressure; and
   (e) a duct unit provided at the side of said connector box and attached thereto, said duct unit leading to a source of said suction force.

2. A smokeless roaster according to claim 1 further including a top grill mounted over said metal grill having suction holes formed therein by penetrating said top plate in a circular manner.

3. A smokeless roaster according to claim 2, wherein said suction holes are arranged in a lengthwise direction.

4. A smokeless roaster according to claim 1 further including a louver provided at a side of said roasting unit for introducing outside air into said smokeless roaster.

5. A smokeless roaster according to claim 1, wherein said inner box is stably supported by said outer box at a constricted part of said outer box.

6. A smokeless roaster according to claim 1, wherein said inner box is smaller in size than said outer box in both lengthwise and widthwise directions and defines a suction passage having a width corresponding to the distance between said outer box and said inner box.

7. A smokeless roaster according to claim 1, wherein said upper end of said outer box has end edges which are bent outwardly in two stages to define flanges fixedly mounted on said ceiling.

8. A smokeless roaster according to claim 1, wherein said upper end of said outer box has end edges which are bent outwardly in two stages to define flanges detachably mounted on said ceiling.

9. A smokeless roaster according to claim 1, wherein said metal grill is a steel grill.

10. A smokeless roaster according to claim 1, wherein said metal grill has slits spaced in a predetermined manner at the upper portion thereof.

11. A smokeless roaster according to claim 1, wherein said gas burner is twined.

12. A smokeless roaster comprising:
    (a) an upper support wall extending horizontally and having an opening contained therein;
    (b) a roasting unit comprising an outer box having an opened upper end, said outer box being mounted and supported within said opening in said upper support wall by end edges thereon, an inner box having an opened upper end contained and supported in the outer box by end edges thereon, said inner box having a metal grill contained at an upper portion thereof and a burner provided at a lower portion thereof, and an exhausting unit provided at a lower part of said roasting unit, said exhausting unit diminishing in outer and inner diameter as it extends away from said lower part of said roasting unit;
    (c) a movable draft pipe vertically, slidably fitted on the outer circumference of said exhausting unit, said movable draft pipe being capable of introducing outside air into gas exhausted from said roasting unit and regulating a suction force applied to said roasting unit, said movable draft pipe additionally having an inner diameter approximately equal to the maximum outer diameter of said exhausting unit;
    (d) a connector box provided at a lower part of said movable draft pipe and connected therewith at a side surface thereof through a fixed pipe, said connector box containing a static pressure equalizer comprising a slit of triangular shape, said slit gradually widening from a lower portion to an upper portion thereof and separating an inner exhaust passage from an outer exhaust passage, said static pressure equalizer equalizing said suction force applied to said roasting unit with a static pressure; and (e) a duct unit provided at the side of said connector box and attached thereto, said duct unit leading to a source of said suction force and being arranged in a L-shaped fashion with said movable draft pipe and the fixed pipe with respect to the connector box.

* * * * *